US012039181B2

(12) United States Patent
Shemer et al.

(10) Patent No.: US 12,039,181 B2
(45) Date of Patent: Jul. 16, 2024

(54) STORAGE ARRAY DATA PROTECTION USING VIRTUAL MACHINE DATA PROTECTION

(71) Applicant: EMC IP Holding Company LLC, Hopkinton, MA (US)

(72) Inventors: Jehuda Shemer, Kfar Saba (IL); Arieh Don, Newton, MA (US); Meir Pinhasov, Haifa (IL); Saar Cohen, Moshav Mishmeret (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 110 days.

(21) Appl. No.: 16/657,518

(22) Filed: Oct. 18, 2019

(65) Prior Publication Data

US 2021/0117095 A1   Apr. 22, 2021

(51) Int. Cl.
*G06F 3/06* (2006.01)
*G06F 9/455* (2018.01)

(52) U.S. Cl.
CPC ............ *G06F 3/065* (2013.01); *G06F 3/0619* (2013.01); *G06F 3/0664* (2013.01); *G06F 3/067* (2013.01); *G06F 9/45558* (2013.01); *G06F 2009/45583* (2013.01)

(58) Field of Classification Search
CPC ...... G06F 3/065; G06F 3/0664; G06F 3/0619; G06F 3/067; G06F 9/45558; G06F 2009/45583
See application file for complete search history.

(56) References Cited

U.S. PATENT DOCUMENTS

| | | | |
|---|---|---|---|
| 6,883,083 B1* | 4/2005 | Kemkar | G06F 3/0605 710/5 |
| 9,063,994 B1* | 6/2015 | Natanzon | G06F 11/1464 |
| 2005/0015407 A1* | 1/2005 | Nguyen | G06F 11/2069 |
| 2013/0036091 A1* | 2/2013 | Provenzano | G06F 16/1844 707/624 |
| 2013/0262638 A1* | 10/2013 | Kumarasamy | H04L 67/34 709/221 |

* cited by examiner

*Primary Examiner* — David Yi
*Assistant Examiner* — Alan Otto
(74) *Attorney, Agent, or Firm* — Workman Nydegger

(57) ABSTRACT

Systems and methods for replicating data from storage. Snapshots are taken of the volumes in physical storage. The snapshot volumes are exposed to a virtual replication system. Using the snapshots, differential or changed data can be identified. The identified data is then replicated by the virtual replication system to a remove virtual replication system.

19 Claims, 2 Drawing Sheets

STORAGE ARRAY DATA PROTECTION USING VIRTUAL MACHINE DATA PROTECTION

FIELD OF THE INVENTION

Embodiments of the present invention generally relate to systems and methods for performing data protection operations. More particularly, at least some embodiments of the invention relate to systems, hardware, software, computer-readable media, and methods for performing data protection operations including replication operations.

BACKGROUND

Data protection operations generally relate to the concept of protecting data. Data can be protected in a wide variety of ways. A typical method for protecting production data is to generate backups of the production data. In the event of a problem with the production data, the backups can be used to resolve the problem.

However, there are many different types of data protection operations. Data replication, for example, generally relates to the concept of replicating data from a source to a target. The details of replication, however, are much more complicated. For example, the management paradigm for virtual replication systems and physical replication systems are distinct and different. A physical replication system is not able to simply replicate the data to a virtual system.

Further, simply exposing the physical volumes to a virtual system configured to replicate the physical volumes does not work at least because the IOs (Input/Outputs) to the physical system do not pass through this virtual system. As a result, simply exposing the physical volumes to the virtual system fails. The ability to replicate data to both a physical system and a virtual system is further complicated by the fact that physical devices (e.g., logical unit numbers or LUNs) are not typically present or are not prevalent in cloud offerings. Consequently, the ability to leverage the benefits of virtual systems in physical systems is not trivial.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
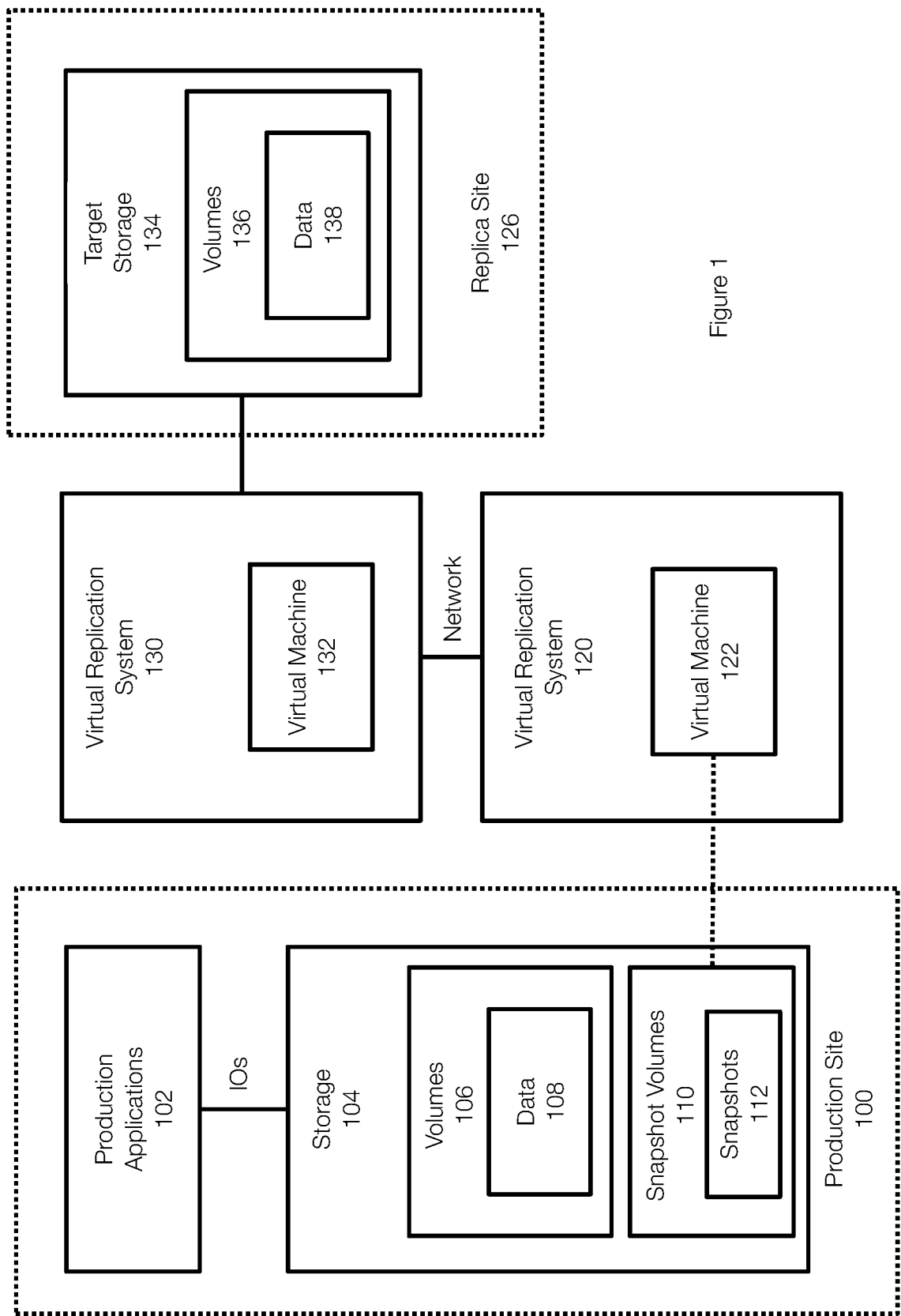
FIG. 1 illustrates and example of a data protection system that includes a virtual replication system or component.

Embodiments of the present invention generally relate to data protection operations. At least some embodiments of the invention relate to systems, hardware, software, computer-readable media, and methods for performing data protection operations. Examples of data protection operations include, but are not limited to, replication operations, backup operations, restore operations, disaster recovery operations, deduplication operations, and other similar and/or related operations. Embodiments further relate to protecting data stored in storage arrays using virtual machines or virtual systems. Embodiments may be performed or implemented in local area networks (LAN), wide area networks (WAN), cellular networks, and/or cloud networks (e.g., datacenters) or combinations thereof.

In general, embodiments of the invention relate to systems and methods for converting or handling physical data, such that the data is compatible with a virtual system (e.g., a virtual business continuity and disaster recovery (BCDR) system). Embodiments of the invention are configured to replicate data from a physical system to a virtual system. Once replicated, the data can be consumed in other manners. The replicated data can be used to generate backups, configured for failover purposes, or the like or combination thereof.

Embodiments of the invention may replicate data from production data itself and/or images, snapshots, or other copies of production data. Dell EMC RecoverPoint Data Protection Software and/or related appliances are examples systems in which embodiments of the invention may be implemented. Embodiments may be implemented, for example, on EMC VNX and XtremIO platforms or other storage platforms.

In one example, embodiments of the invention may include taking snapshots of data such as production data. Using the snapshots, changed data in the production data can be identified. For example, comparing a current snapshot with a previous snapshot allows changed areas or blocks to be identified. Replication can be performed by sending only the changed areas or the changed blocks from the source to the target or replica site.

More specifically, a snapshot represents or is a copy of production data at the time the snapshot was taken. Replication can be performed using snapshots because the data in the snapshots is essentially fixed and does not change. This is more difficult with production data, which is changing over time. Plus, as previously discussed, the IOs to the production data may not pass through the virtual replication system because the production applications are attached to the physical storage.

Embodiments of the invention allow the production data to be protected using virtual machines or virtual replication systems and facilitates use of the replicated data in an environment such as a cloud-based storage environment.

Identifying changes to source or production data in snap based replication can be performed in different manners. In one example, the snapshots may use or be associated with change block tracking or other differential mechanisms that allow the areas or blocks that have actually changed to be transferred or replicated efficiently. More specifically, changed data or blocks can be tracked from a particular point in time such as the last time a backup of snapshot was performed. Changes to data can be determined based on a differential between a current snapshot and a previous snapshot. A bitmap may be used to identify changed blocks.

In one example, a series of snapshots can be maintained. For example, a first snapshot S1 is taken. Subsequently, a snapshot S2 is taken. The changed areas or changed data can be identified by differencing the snapshots (S2–S1). These identified changes to data can be replicated. Once the replication of these differences is completed, S1 can be discarded if desired. When a new snapshot S3 is taken, the differences or changed data can be identified by differencing S3 and S2 (S3−S2). This allows the snapshot S2 to be discarded when appropriate. Thus, embodiments of the invention are able to identify the data that has changed with respect to a snapshot such as a current snapshot. The changed data can be replicated.

Embodiments of the invention, after identifying the changed data, replicate the data to a replica site, which may also be associated with a virtual replication system.

FIG. 1 illustrates an example of a virtual replication system configured to replicate data from a production site to a replica site. FIG. 1 illustrates an example of a production site 100 that includes production applications 102 and production storage 104. The storage 104 may include storage devices including storage arrays or other storage types or devices and configurations. The production applications 102 may access and use (e.g., read, write, copy, modify etc.) data 108, which may be changing over time based on the operation of the applications 102.

The data 108 is stored on volumes 106. FIG. 1 illustrates that IOs to the storage 104 and to the volumes 106 occur between the production applications 102 and the storage 104. As previously indicated, simply exposing the volumes 106 to a virtual replication system will likely fail, from the perspective of replication, because the IOs are not recognized or seen by or exposed to the virtual replication system.

To perform data protection applications for the production site 100, a virtual replication system 120 is provided. The virtual replication system 120 may include or be associated with a virtual machine 122 and other infrastructure such as hypervisor (ESX) and control center (Vcenter). In this example, the virtual replication system 120 is configured to perform snapshot based replication. When a snapshot of the volumes 106 is triggered, snapshots 112 of the volumes 106 or of the data 108 are performed and stored as the snapshots 112 on snapshot volumes 110. In one example, there is a snapshot volume for each of the volumes 106 or for each of the volumes 106 subject to replication.

In one example, a consistency group of volumes 1-n are subject to a replication operation. In this example, snapshot volumes (SV1-SVn) are prepared to correspond to the volumes (V1-Vn). The snapshots of volume V1-Vn are stored, respectively, on snapshot volume SV1-SVn.

In FIG. 1, the snapshot volumes 110 (and thus the snapshots 112) are exposed to the virtual machine 122 (or to or through a hypervisor) using, by way of example only, raw disk mapping. Raw disk mapping exposes the snapshot volumes 110 as a virtual volume (e.g., VMDK) to the virtual machine 122.

To further establish replication, a virtual replication system 130 may also be established and associated with a replica site 126. The replica site 126 may be a remote system or based in the cloud or a datacenter, by way of example. The replica site 126 is associated with a target storage 134 that includes volumes 136. The volumes 136 may be similar to the volumes 106. In one example, the volumes 136 have the same configuration as the volumes 106. This facilitates the replication of the data 108 as the replicated data can be written to locations on the volumes 136 that correspond to the source locations on the volumes 106. Alternatively, the data 138 can also be stored in different manners. The data 138 can also be backed up (e.g., by taking snapshots of the replicated data 138). The data 138 can reflect the current or near-current status of the data 108. There may a difference between the data 108 and the data 138 due to the replication process. The snapshots of the data 138 or of the volumes 136 thus correspond to backups of the production data.

In one example, the data 138 can be used in a physical to virtual transformation. If the production site 100 includes a machine that is directly mapped to storage devices such as LUNs, the replicated data 138 can be transformed, at the replication site 126 to be a virtual machine mapped to virtual devices.

The virtual replication systems 120 and 130 may each include virtual machines and related infrastructure such as hypervisors and control centers. The virtual replication systems 120 and 130 may be replication appliances (physical and or virtual) and may be configured to communicate over a network. Once the replication system is set up as illustrated in FIG. 1, the data sweep or replication of the volumes 106 can be performed.

During replication, the virtual replication system 120 may trigger a protection cycle or a snap based replication cycle. This causes the snapshots 112 to be refreshed with new or current snapshots while keeping change tracking bits or snapshot differential data or other information that identifies changes to the data or that allows the changes to be obtained. The virtual replication system 120 can then read the tracking bits or the calculated differential areas. These areas may be marked as changed. The changes areas or blocks are then synchronized or replicated to the virtual replication system 130.

The replica site 126 can handle the received data in different ways. The received data can be journaled, which may allow for continuous backups. The received data can be placed in snap arrays that do not support journaling. In this case, a snap base cycle may be performed at the replica site 126 in order to store multiple points in time. In addition, the received data can be sent to the cloud or other locations.

The virtual replication system 130 may communicate with or be associated with a virtual infrastructure (e.g., VCenter and ESXs) to manage virtual machines and prepare the replicated data for consumption. The replicated data may be used as backups or to generate backups, as a failover system, or the like.

Figure 2:
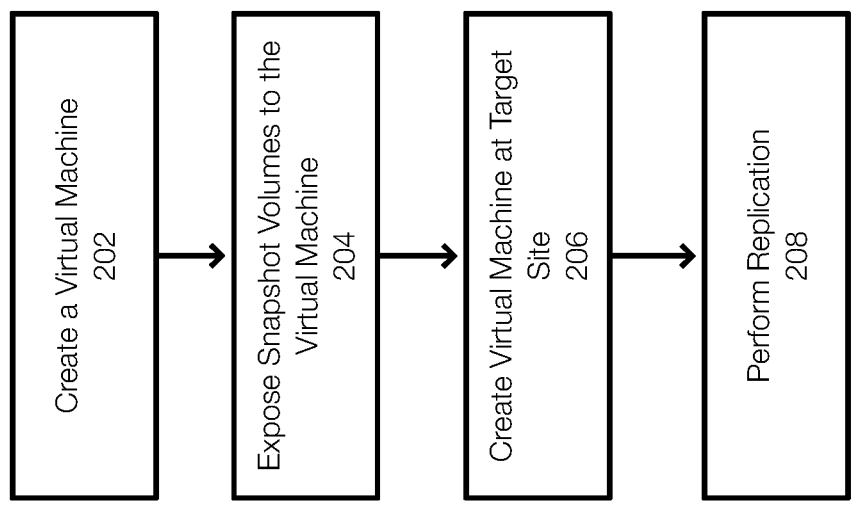
FIG. 2 further illustrates an example of a method for replicating data with a virtual replication system.

FIG. 2 illustrates an example of a method for replicating data. FIG. 2 allows for the replication of both physical and virtual systems using a single virtual replication system. Embodiments of the invention further expose physical storage to virtual use cases and bring the advantages and ease of use of maintaining replication systems including virtual replication systems to a physical storage.

In FIG. 2, a virtual machine is created 202 and configured to replicate a storage group such as a consistency group of volumes of physical storage. Creating the virtual machine may be part of implementing a virtual replication system, which may also include virtual infrastructure and support. Snapshot volumes may also be created.

Next, the snapshot volumes are exposed 204 to the virtual machine. In one example, the virtual replication system may create a virtual machine with snapshot volumes SV1-SVn attached to the virtual machine using raw device mapping techniques. In particularly, the snapshot volumes may be exposed to a hypervisor such as ESX and the virtual machine is placed on the hypervisors where the snapshot volumes are exposed or mounted.

When the target or replica site is a storage array, a similar virtual environment or system may be initiated or created 206 at the target site. Replication is then performed 208 once protection is established and the data identified by the snapshots can be transferred or replicated. The virtual replication system at the replica site may write the data to virtual disks or volumes that correspond to the volumes being replicated.

Figure 3:
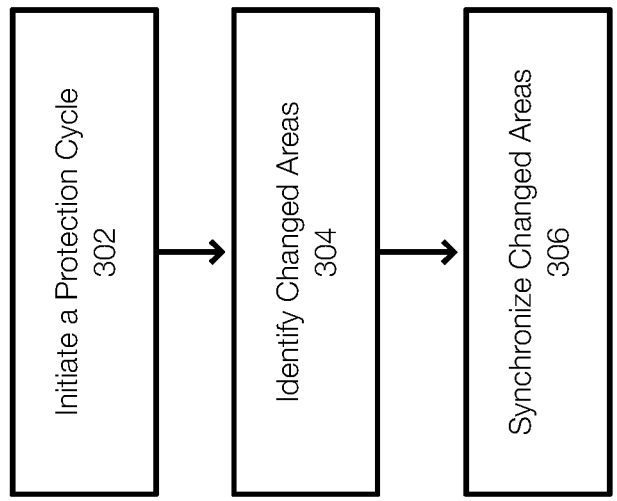
FIG. 3 illustrates another example of a method for replicating data with a virtual replication system.

FIG. 3 illustrates an example of a method for sending the data being replicated or the changed data from the source to the target. In one example, a protection cycle is initiated 302. The protection cycle (or snap based replication) cycle may refresh the snapshots of the volumes being replicated. The protection cycle may also keep change tracking bits or snapshot differential data. For example, a current snapshot can be compared to an older snapshot to identify a snapshot differential and to identify the changed data or areas. In this manner, the changed areas or blocks are identified 304.

The changed areas or blocks are then replicated 306. The snapshot volumes can be read by the virtual replication system to retrieve the changed data and the changed data can be sent to the replica site. In addition to replicating the data, virtual replication allows for sending data to the cloud. Image access and failover continue to be available.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

In particular, one advantageous aspect of at least some embodiments of the invention allow data associated with a physical replication system to also be used with a virtual management paradigm. Data can be managed using a virtual data protection paradigm, which may include sending data to the cloud. Embodiments of the invention allow data protected or replicated by physical protection systems to be protected or replicated by virtual protection operations. As discussed herein, a journal may be used as a cascading mechanism to connect between the two different systems.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, data protection operations including replication operations, backup operations, restore operations, or the like or combination thereof. Additional operations may include, but are not limited to, data read/ write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment and RecoverPoint systems, whether implemented virtually or physically. In general however, the scope of the invention is not limited to any particular data backup platform or data storage environment or other data protection system.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), containerized applications, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

For any of the aforementioned elements comprise or consist of a virtual machine (VM), that VM may constitute a virtualization of any combination of the physical components disclosed herein. A physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to data protection operations.

Following are some further example embodiments of the invention. These are presented only by way of example and are not intended to limit the scope of the invention in any way.

Embodiment 1

A method for replicating data from storage of a production site, the method comprising performing a protection cycle to create and store snapshots of volumes on snapshot volumes, wherein the volumes store production data, identifying changed data in the production data from the snapshots by a virtual data protection system that includes a virtual machine, and replicating the changed data to storage of a replica site by the virtual data protection system.

Embodiment 2

The method of embodiment 1, further comprising performing the protection cycle on a consistency group.

Embodiment 3

The method of embodiment 1 and/or 2, further comprising exposing the snapshot volumes to the virtual machine such that the snapshot volumes are virtual disks.

Embodiment 4

The method of embodiment 1, 2 and/or 3 further comprising exposing the snapshot volumes using raw device mapping.

Embodiment 5

The method of embodiment 1, 2, 3, and/or 4, further comprising identifying the changed data using a changed bit tracker or snapshot differentials.

Embodiment 6

The method of embodiment 1, 2, 3, 4 and/or 5 further comprising replicating the changed data to a second virtual data protection system associated with the replica site.

Embodiment 7

The method of embodiment 1, 2, 3, 4, 5 and/or 6, wherein the second virtual data protection system comprises a virtual machine associated with virtual disks.

Embodiment 8

The method of embodiment 1, 2, 3, 4, 5, 6, and/or 7, wherein the virtual disks are configured as volumes that correspond to the volumes being replicated.

Embodiment 9

The method of embodiment 1, 2, 3, 4, 5, 6, 7, and/or 8, wherein the virtual data protection system comprises a replication appliance or wherein the protection system is initiated by the virtual data protection system.

Embodiment 10

The method of embodiment 1, 2, 3, 4, 5, 6, 7, 8, and/or 9, further comprising refreshing the snapshots of the volumes with new snapshots.

Embodiment 11

The method of embodiment of 1, 2, 3, 4, 5, 6, 7, 8, 9, and/or 10, further comprising repeatedly performing the protection cycle.

Embodiment 12

The method of embodiment 1, 2, 3, 4, 5, 6, 7, 8, 9, 10 and/or 11, further comprising taking snapshots of the replicated data at the replica site.

Embodiment 13

The method of embodiment 1, 2, 3, 4, 5, 6, 7, 8, 9, 10, 11, and/or 12.

Embodiment 14

The method of embodiment 1, 2, 3, 4, 5, 6, 7, 8, 9, 10, 11, 12, and/or 13 further comprising journaling the replicated data at the replica site or placing the replicated data in a snapshot.

Embodiment 15

A method for replicating data from a production site to a replica site, the method comprising providing a virtual replication system that includes a virtual machine configured to replicate data, mounting snapshot volumes at the production site to the virtual machine such that the snapshot volumes are virtual disks to the virtual machine, performing or initiating a snap based replication cycle, by the virtual replication system, to generate snapshots of production data stored on volumes, wherein the snapshots are stored on the snapshot volumes, identifying, by the virtual replication system, changed data in the production data from the snapshots, and sending, by the virtual replication system, the changed data to the replica site.

Embodiment 16

The method of embodiment 15, further comprising performing the snap based replication cycle on a consistency group that includes the volumes such that the snapshots of the volumes are taken at the same time.

Embodiment 17

The method of embodiment 15 and/or 16, further comprising exposing the snapshot volumes using raw device mapping when mounting the snapshot volumes to the virtual machine.

Embodiment 18

The method of embodiment 15, 16, and/or 17 further comprising identifying the changed data using a changed bit tracker or snapshot differentials, wherein sending the changed data includes replicating the changed data to a second virtual data protection system associated with the replica site, wherein the replica site includes a second virtual data protection system comprising a virtual machine associated with virtual disks.

Embodiment 19

The method of embodiment 15, 16, 17, and/or 18, wherein the virtual disks are configured as volumes that correspond to the volumes being replicated.

Embodiment 20

The method of claim 15, 16, 17, 18, and/or 19, further comprising repeatedly performing the snap based replication cycle to refresh the snapshots, wherein identifying the changed data includes performing a snapshot differential.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment. The order of in which the methods or processes discussed herein may be performed sequentially, simultaneously, and/or in different orders.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for replicating data from physical storage of a production site with a virtual data protection system, the physical storage including volumes and snapshot volumes, wherein the volumes are physical volumes and the snapshot volumes are physical volumes, the method comprising:
    performing a protection cycle at the production site, by a physical system, to create a current snapshot of each volume and store the current snapshot of each volume on a corresponding snapshot volume, wherein the volumes store production data;
    exposing the snapshot volumes to the virtual data protection system as virtual volumes;
    identifying, by the virtual data protection system, changed data in the current snapshots saved in the snapshot volumes from previous snapshots currently saved in the virtual volumes, wherein the virtual data protection system includes a virtual machine;
    marking the changed data by the virtual data protection system;
    replicating the marked changed data to volumes included in a storage of a replica site by the virtual data protection system, wherein configuration of the physical volumes of the production site is same as configuration of the volumes of the replica site so that the changed data is written to locations in the volumes of the replica site corresponding to locations of the physical volumes of the production site; and
    replicating the marked changed data to a second virtual data protection system associated with the replica site.

2. The method of claim 1, further comprising performing the protection cycle on a consistency group.

3. The method of claim 1, further comprising exposing the snapshot volumes to the virtual machine such that the snapshot volumes are virtual disks.

4. The method of claim 3, further comprising exposing the snapshot volumes using raw device mapping.

5. The method of claim 1, further comprising identifying the changed data using a changed bit tracker or snapshot differentials.

6. The method of claim 1, wherein the second virtual data protection system comprises a virtual machine associated with virtual disks.

7. The method of claim 6, wherein the virtual disks are configured as volumes that correspond to the physical volumes being replicated.

8. The method of claim 1, wherein the protection cycle is initiated by the virtual data protection system.

9. The method of claim 1, further comprising refreshing the snapshots of the physical volumes with current snapshots.

10. The method of claim 1, further comprising repeatedly performing the protection cycle.

11. The method of claim 1, further comprising taking snapshots of the replicated data at the replica site.

12. The method of claim 1, further comprising journaling the replicated data at the replica site or placing the replicated data in a snapshot.

13. A method for replicating data from a production site to a replica site, the method comprising:
    providing a virtual replication system that includes a virtual machine configured to replicate data;
    mounting snapshot volumes at the production site to the virtual machine such that the snapshot volumes are virtual disks to the virtual machine, wherein the snapshot volumes are mounted in a physical storage of the production site that includes physical volumes that store production data;
    initiating a snap based replication cycle, by the virtual replication system, wherein the snap based replication cycle is performed by a physical system to generate a current snapshot of each physical volume of the production data, wherein the current snapshots generated from the physical volumes are stored on the snapshot volumes;
    identifying, by the virtual replication system, changed data in the current snapshots from previous snapshots currently saved in virtual volumes of the virtual replication system;
    marking the changed data by the virtual replication system;
    sending, by the virtual replication system, the marked changed data to the replica site, wherein a configuration of the physical volumes of the production site is same as configuration of volumes of the replica site so that the changed data is written to locations in the volumes of the replica site corresponding to locations of the physical volumes of the production site; and
    replicating the marked changed data to a second virtual data protection system associated with the replica site.

14. The method of claim 13, further comprising performing the snap based replication cycle on a consistency group that includes the volumes such that the current snapshots of the physical volumes are taken at the same time.

15. The method of claim 13, further comprising exposing the snapshot volumes using raw device mapping when mounting the snapshot volumes to the virtual machine.

16. The method of claim 13, further comprising identifying the changed data using a changed bit tracker or snapshot differentials, wherein the replica site includes a second virtual data protection system comprising a virtual machine associated with virtual disks.

17. The method of claim 16, wherein the virtual disks are configured as volumes that correspond to the volumes being replicated.

18. The method of claim 13, further comprising repeatedly performing the snap based replication cycle to refresh the snapshots, wherein identifying the changed data includes performing a snapshot differential.

19. A non-transitory computer readable medium comprising computer executable instructions configured to implement the method of claim 13.

* * * * *